United States Patent [19]

Jankowski, Jr.

[11] 4,192,979
[45] Mar. 11, 1980

[54] APPARATUS FOR CONTROLLING ECHO IN COMMUNICATION SYSTEMS UTILIZING A VOICE-ACTIVATED SWITCH

[75] Inventor: Joseph Jankowski, Jr., Silver Spring, Md.

[73] Assignee: Communications Satellite Corporation, Washington, D.C.

[21] Appl. No.: 919,520

[22] Filed: Jun. 27, 1978

[51] Int. Cl.² .............................................. H04B 3/20
[52] U.S. Cl. .............................. 179/170.2; 179/170.6; 179/1 VC
[58] Field of Search ............... 179/170.2, 170.6, 170.8, 179/1 HF, 1 P, 1 VC, 15 AS

[56] References Cited

U.S. PATENT DOCUMENTS

| | | | |
|---|---|---|---|
| 3,823,275 | 7/1974 | La Marche et al. | 179/170.6 |
| 3,896,273 | 7/1975 | Fariello | 179/170.2 |
| 3,906,172 | 9/1975 | Hoeschele, Jr. et al. | 179/170.6 |
| 3,985,979 | 10/1976 | Durand et al. | 179/170.6 |
| 4,008,375 | 2/1977 | Lanier | 179/1 VC |
| 4,028,496 | 7/1977 | La Marche et al. | 179/1 P |
| 4,052,568 | 10/1977 | Jankowski | 179/1 SA |

Primary Examiner—Bernard Konick
Assistant Examiner—Randall P. Myers
Attorney, Agent, or Firm—Alan J. Kasper; John R. Berres; William M. Wannisky

[57] ABSTRACT

An apparatus for blocking the transmission of echo signals in telephone communications circuits is disclosed. The apparatus employs a voice-activated switch in the transmit channel at each telephone terminal of the telephone circuit to block transmission of signals below a selectable threshold. Under all conditions where received speech signals are present at a telephone terminal, a higher threshold for the switch at that terminal is selected than would otherwise be used to block noise in the channel. This higher threshold is set above the level of the echo signals to prevent their transmission from that terminal by the switch.

12 Claims, 6 Drawing Figures

APPARATUS FOR CONTROLLING ECHO IN COMMUNICATION SYSTEMS UTILIZING A VOICE-ACTIVATED SWITCH

BACKGROUND OF THE INVENTION

The present invention relates to the control of echo on telephone circuits and to voice-activated switches which have been used to block noise and activate channels in telephone communications systems. (As used herein a "circuit" includes all the paths for transmission and reception of signals between talkers or telephone users in a conversation, while a "channel" is the transmission path for signals in a single direction. A circuit therefore can be comprised of at least two channels, and a channel can be comprised of all media, such as cables and satellite links, often called "trunk lines", which provide one-way transmission for signals.) The invention is particularly relevant to those systems which employ speech interpolation techniques for combining speech signals from several circuits in a single channel.

Noise, which typically is present on all communications channels, but at a significantly lower level than speech, must be minimized to provide efficient and coherent voice communication. Typically, voice-activated switches are used to recognize speech in the presence of noise in telephone communication circuits; they allow those signals that exceed a predetermined threshold level to pass into the circuit. The threshold level of the voice-activated switch is selected to be responsive to signals above the level of noise expected to be encountered on a telephone circuit. In some types of voice-activated switches the threshold level is fixed at a predetermined value, while other types, called adaptive voice switches, employ associated control circuits which enable the threshold to be continuously adjusted to remain at a level just above the noise. The inability of voice switches to detect the presence of all speech results in a "clipping" of the conversation when speech signals fall below the the predetermined noise threshold. The more complex adaptive threshold switches tend to "clip" the transmitted signals less than those having fixed thresholds since the adaptive threshold is always no higher than is necessary above the instantaneous noise level. Examples of these several types of voice-activated switches may be found in U.S. Pat. Nos. 4,008,375 (Lanier) entitled "Digital Voice Switch for Single or Multiple Channel Application"; 3,890,467 (Scuilli) entitled "Digital Voice Switch for Use with Delta Modulation" and 3,832,491 (Scuilli et al) entitled "Digital Voice Switch with an Adaptive Digitally-Controlled Threshold". Also see U.S. Pat. No. 4,052,568 (Jankowski) entitled "Digital Voice Switch".

In addition to apparatus for reducing noise, systems for controlling echo in telephone circuits have been developed because perceived echo is offensive to telephone users and, in certain types of communications systems, all echo signals (including those that may not be noticeable to telephone users) will tend to degrade communications system performance in other ways. This is particularly true of speech interpolation communications systems which will be discussed below.

Echo is generated at the two-to-four wire-interface, called a hybrid, which couples individual telephones into a telephone circuit. Because of impedance mismatches, typically created by variation in lengths of the wires connecting individual telephones to the hybrids, partial reflections of signals arriving at the hybrid will occur. The reflection of received signals back to a transmitting telephone results in echo on the circuit connecting two telephones. If the physical length of the channels which interconnect the hybrids in a telephone circuit are sufficiently long, the propagation time for signals in the circuit will be large enough for the echo to be noticed by the telephone user. If the physical channel (trunk line) length is short, some echo may still be present, although it may go unnoticed by the telephone user.

In telephone communication systems, echo signals which may be present tend to resemble low level speech signals. The echo signals are frequently at an amplitude level greater than the voice switch threshold level set to reject noise. Thus, to a conventional voice switch, many echo signals would be indistinguishable from low level speech signals. Because conventional voice switches must be designed to be sensitive to a varied range of speech levels in order to accommodate high and low level speakers, they generally will respond to an echo signal as if it were speech.

In order to deal with the problems associated with echo, telephone communications systems have employed echo suppressors in each telephone circuit. Echo cancellers which provide superior performance to echo suppressors, also can be used. However, use of either cancellers or suppressors adds significant cost to the construction of a telephone system.

Echo suppressors in general block echo signals by inserting an attenuation in the transmit channel for a telephone in a telephone circuit to reduce the echo. They are commonly used in both the transmit and receive channels of a long distance communications circuit. These devices are successful in reducing echo. However, because echo suppressors attenuate transmit speech signals when signals are present on the receive channel, when both speakers on a telephone circuit are talking simultaneously (doubletalk), there are noticeable changes in level of the speech signals which can prove disturbing to the talkers. For example, during doubletalk, when one speaker starts or stops talking, a distinct and frequently annoying change in the speech level of the other speaker can be heard. Because of these frequent changes in channel attenuation during doubletalk situations, use of suppressors can result in confusing and offensive speech transmission. Echo cancellers, on the other hand, do not present this difficulty since they remove echo from the transmit channel by generating a signal from the receive speech, which is a replica of the echo. The canceller then subtracts this echo replica signal from the transmit signal so as to cancel the echo. Echo cancellers have fewer of the limitations of the suppressors, but are substantially more complex and expensive.

In addition to being useful in controlling noise, voice switches also are useful in communications systems employing forms of speech interpolation, wherein each trunk line may carry speech signals from parties to more than one conversation. Interpolation of speech signals from several conversations is permitted by the usual pauses or breaks in speech activity by one or both parties to each conversation. One technique of interpolation currently used in telephone communications is called digital speech interpolation (DSI). An article entitled "Digital Speech Interpolation", by S. J. Campanella published in the *Comsat Technical Review*, Vol. 6, No. 1, and U.S. Pat. Nos. 3,542,956 (Sekimoto) entitled "PCM Telephone Communication System";

3,927,268 (Sciulli et al) entitled "Speech Predictive Encoded Communication System"; and 3,988,674 (Sciulli) entitled "Frame Synchronization for Speech Predictive Encoded Communications Systems" furnish descriptions of several types of DSI implementations.

In interpolation systems, voice switches serve to sense the presence or absence of speech signals in several conversations and thus control the transmission of signals on a single shared circuit. In many interpolation systems, including DSI, a voice-activated switch is used not only to detect the presence of speech for transmission but also to perform its usual function of blocking noise, especially that typically found on the idle channels. However, since echo signals are generally of a higher magnitude than the noise level in a circuit, they may exceed the noise-proof threshold of the switch. Since echo signals would be passed by a conventional voice-activated switch used in interpolation systems, the interpolation system will experience extra loading due to the transmission of the echo signal. During periods of heavy traffic, the overall system performance will be degraded due to the artificial activation of channels by voice switches responding to echo signals. Even those echo signals which are not noticeable to telephone users can also act to degrade interpolation system performance. These inaudible echo signals can be encountered in long distance circuits (such as those provided by cable or satellites) and can be present in relatively short transmission paths as well.

There is therefore a need to provide a means whereby the voice switches used in interpolation systems are able to block echo signals while at the same time being sufficiently sensitive to low level talkers. Further, all telephone communications systems, not just interpolation systems, require a new means of echo control which operates during doubletalk conditions in a less offensive manner than echo suppressors, but which also is less expensive and less complex than an echo canceller.

The present invention seeks to meet these needs by means of a circuit for appropriately controlling a voice switch during those circuit conditions which allow echo to occur. Although particularly useful in interpolation system applications such as DSI, it provides a simple, effective means of echo control in a great number of communications circuit applications, providing an alternative to echo cancellers and echo suppressors.

SUMMARY OF THE INVENTION

The present invention provides echo control in communications circuits by utilizing a voice-activated switch in the transmit circuit path or channel associated with each telephone in the circuit. The voice switch utilized in the invention may have a lower "noise-proof" threshold, but in all cases utilizes a higher "echo-proof" threshold. In various embodiments of the invention, either of these thresholds or both of them may be adjusted in an adaptive manner to compensate for changes in noise level on the channels. The invention employs a means for desensitizing the voice switch to low level signals in those cases where there are signals present on the receive circuit path or channel of the telephone terminal. This is accomplished by increasing the threshold from the lower (e.g., "noise-proof") threshold level for which the voice switch is normally rendered conductive to the higher "echo-proof" level. As a result, low level echo signals caused by reflections of the received signals at the hybrid interface for the telephone terminals do not activate the switch, but normal speech above the threshold will be transmitted. In general, low level transmitted signals also will be clipped when the higher threshold is operative, however this clipping would occur only during doubletalk. Under doubletalk conditions the amount of clipping would not be as readily noticeable nor as offensive to a listener as the changes in channel attenuation by echo suppressors which occur for all levels of speech during doubletalk. Further, the implementation of the invention in the environment of a digital speech interpolation system is simple and inexpensive when compared to either echo cancellers or echo suppressors.

Additional features and advantages of this invention will appear from the following description, taken with the accompanying drawings in which:

DETAILED DESCRIPTION OF PREFERRED EMBODIMENTS

The present invention, in preferred embodiments described herein, comprises a voice-activated switch for use as an echo control in each transmission channel of a two-way telephone circuit that utilizes a threshold means of voice detection that is responsive to speech in the receive channel of the circuit. The invention in several of these embodiments is described as incorporated in a DSI system because this appears to be a particularly suitable application. It is to be understood that the invention has advantages in telephone systems other than DSI systems and with other voice switch algorithms; it will therefore also be described with regard to more general applications than DSI systems. It should also be noted that the invention need not necessarily require a lower "noise-proof" threshold, but may be configured such that it need only be employed for echo control using a single "echo-proof" threshold under the appropriate circumstances. However, because the addition of noise control features appear advantageous, the embodiments described herein include such features.

Figure 1:
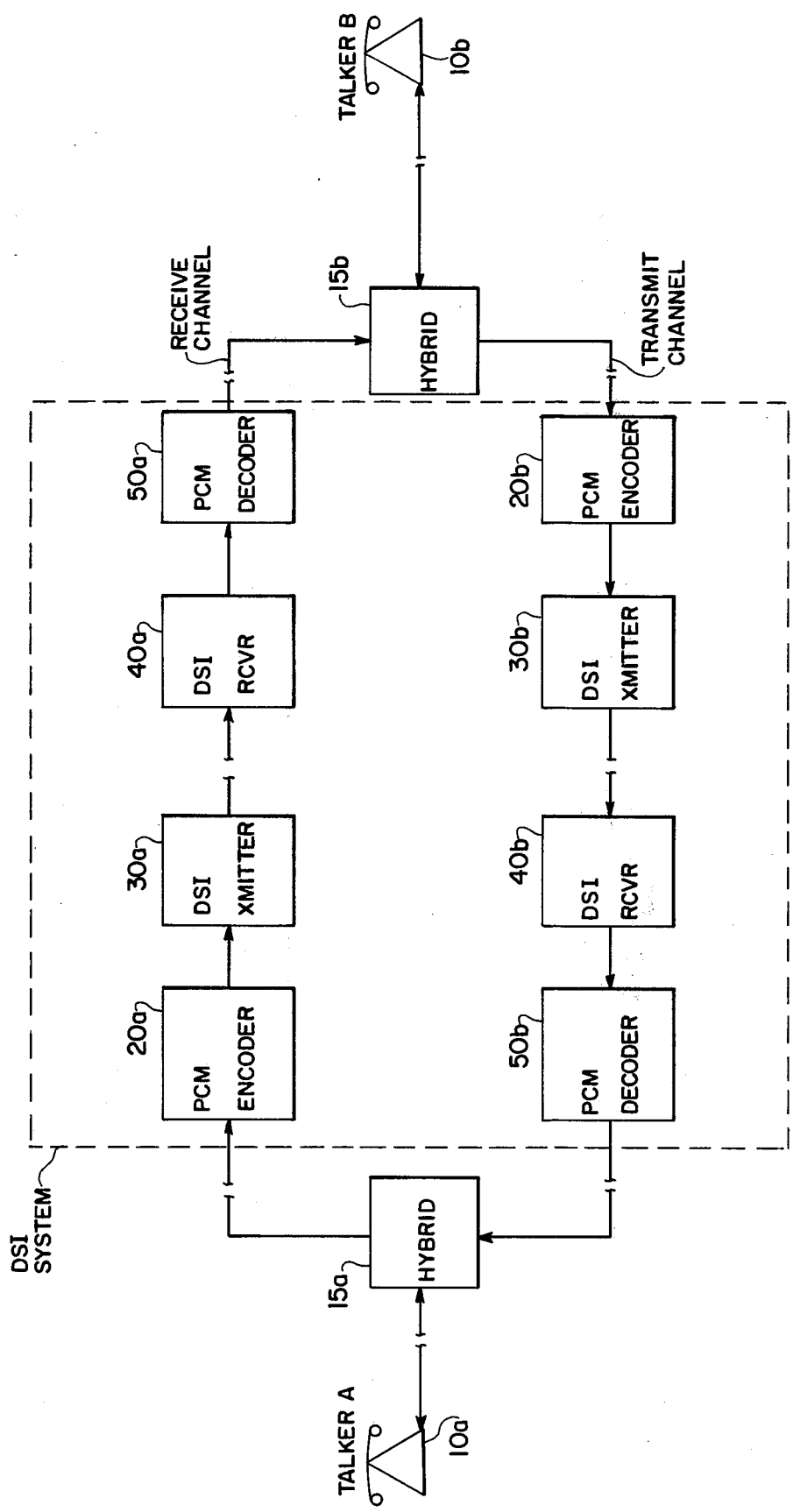
FIG. 1 is illustrative of a prior art, digital speech interpolation (DSI) system forming an environment for embodiments of the invention.

A generalized DSI system is illustrated in FIG. 1 which has a single telephone circuit incorporating a pair of two-to-four wire hybrid couplers 15a and 15b. The hybrid couplers 15a and 15b are each connected to a respective telephone 10a and 10b, corresponding to two talkers, A and B. This structure would normally be found in any two-to-four wire telephone communication circuit arrangement. The illustrated DSI system also uses, on the receive side for talker B, a pulse code modulation (PCM) analog to digital (A-D) encoder 20a, a transmitter 30a, a receiver 40a and a PCM decoder 50a, comprising a receive channel for digital encoding and decoding of analog speech signals originating from telephone 10a. (As used herein, if not otherwise indicated, "transmit" and "receive" will refer to signals transmitted and received respectively by talker B at telephone 10b.) Similarly, on the transmit side, comprising a transmit channel of the circuit, a PCM encoder 20b, a transmitter 30b, a receiver 40b, and a PCM decoder 50b are provided. (In the simplest type of telephone circuit, to which the present invention is also applicable, the transmit and receive channels shown within the dashed lines in FIG. 1 as comprising the DSI encoder/decoder and DSI transmitter/receiver apparatus would be comprised of some direct hard wire equivalent, such as standard telephone cables.)

Typically, echo is noticed when a speaking party (e.g., talker A in FIG. 1) in a two-way telephone conversation hears his own voice returned to him, delayed in time. The echo is caused by a reflection of the speakers' signals at a hybrid interface, such as 15b at the other party's (e.g., talker B's) location. Thus for echo to exist at telephone 10a and be heard by talker A in the system illustrated in FIG. 1, talker A's transmitted signals must be received (such as at receiver 40a associated with talker B's receive channel) at telephone 10b (talker B) for reflections to take place at hybrid 15b and echo to be propogated back to talker A via talker A's receive channel (talker B's transmit channel). Similarly, the hybrid 15a causes the speech from talker B to be returned as echo at telephone 10b.

Voice switches have been used to block noise, and in interpolalation systems to activate a transmitter as well, (such as 30b in talker B's transmit channel). Because the threshold level for these switches have been set near the noise level, echo signals have not been blocked since they generally are at a higher level than the noise. Thus in the prior art, without some additional means for echo control, echo of one talker's speech, such as A's may be returned to him in the transmit channels of the other party, such as B's transmit channel (A's receive channel) since the voice switch in this channel will not block echo.

In order to make the voice switch in a transmit channel responsive to echo, the present invention utilizes the fact that in a telephone circuit like that of FIG. 1, for echo to be created by talker A, for example, a hybrid coupler such as 15b must receive talker A's voice signals via the receive channel (i.e., talker B's receive channel) and reflect a portion of such received signals into talker B's transmit channel. Therefore in those situations where receive signals (i.e., A's voice signals) would be encountered by hybrid 15b, for example, in accordance with the present invention, a voice switch in talker B's transmit channel would employ a threshold higher than the noise-proof threshold in order to block any of A's voice signals reflected as echo by the hybrid 15b in talker B's transmit channel. When none of talker A's voice signals would be present at hybrid 15b, the voice switch in talker B's transmit channel would employ the lower, noise-proof threshold. The same arrangement would be provided for hybrid 15a at speaker A's side of the circuit. This general approach would be similar for both interpolation systems and conventional systems, that is, in any telephone circuit employing a two-to-four wire hybrid interface. In a DSI system application, the threshold of the threshold-sensitive voice switch normally utilized for noise rejection by a DSI transmitter, (e.g., 30b of FIG. 1), is upwardly adjusted in order to prevent encoding of echo signals by the transmitter upon receipt of received signal samples by its associated receiver (e.g., 40b of FIG. 1). Such DSI applications and general applications of the invention will be described in greater detail below.

In the prior art, the threshold level for threshold-sensitive voice switches has been set either at a fixed value, or at an adaptive value which is always to be above the noise level present in a channel. All signals above the threshold level activate the switch and are passed. Those signals whose values are below the threshold level cannot activate the switch and are blocked. The threshold level may be fixed at a level which is a good compromise between low level speech sensitivity and noise immunity. In adaptive switches it may be varied so as to be continuously adjusted to remain slightly above the noise level; this tends to reduce the amount of clipping to which transmitted voice signals are subjected. Examples of an adaptive voice-activated switch can be obtained with reference to the aforementioned U.S. Pat. Nos. 4,008,375; 3,832,491; and 4,052,568.

In accordance with the invention, since echo can only exist if received speech signals are present at a hybrid such that they can be reflected as echo into the transmit channel, echo control in a telephone circuit may be accomplished by increasing the threshold level of a threshold-sensitive switch in the transmit channel only when received speech signals are present in the receive channel. Of course, the level of the increased threshold should be such that it entirely blocks only the lower-amplitude level echo signals. It should not be so high as to entirely block or substantially clip the speech normally originating at the telephone corresponding to the hybrid with which the switch is associated.

Figure 2A:
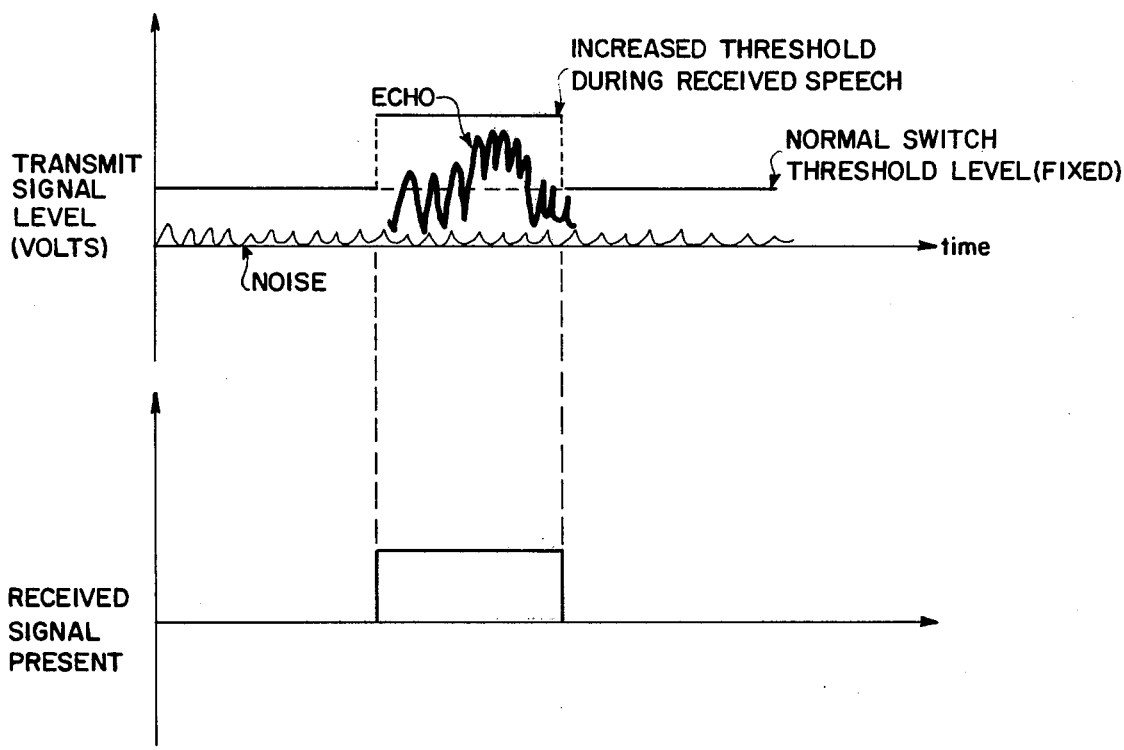
FIG. 2 illustrates in graphic form the principles of operation of embodiments of the present invention for control of echo, for a predetermined fixed "noise-proof" threshold level in FIG. 2A, or for an adaptive "noise-proof" threshold level in FIG. 2B.
Figure 2B:
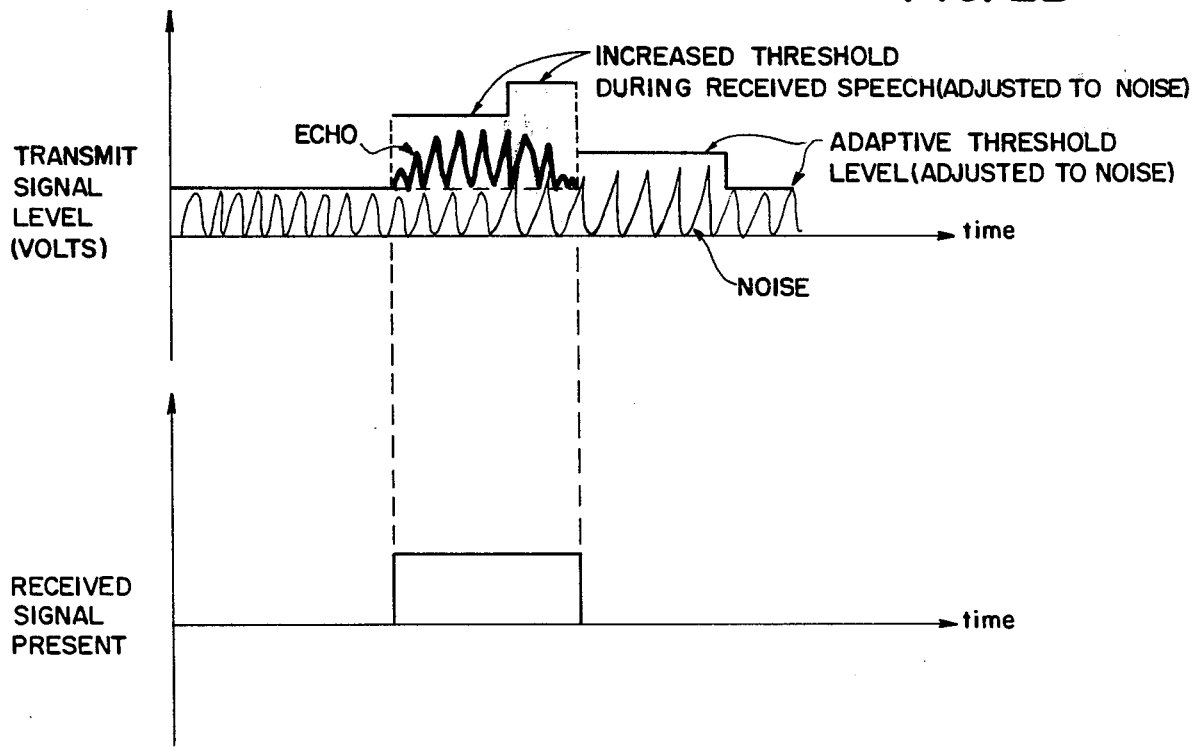

FIGS. 2A and 2B illustrate the operation of the present invention employing different noise level thresholds. FIG. 2A illustrates the case of a lower predetermined (fixed) voice switch "noise-proof" threshold; FIG. 2B illustrates the case of a lower noise level-adjusted adaptive threshold. In both the two illustrated cases, low level echo signals would not typically exceed the higher level echo-proof thresholds set for the switch and would thus be blocked by the voice switch. Normally transmitted speech above the echo-proof threshold may encounter only occasional clipping of the low level sound during the doubletalk condition. This is due to the fact that the average echo signal level is typically 16 db (measured as echo return loss) lower in level than the speech signal. An occasional clip of the transmitted speech during the doubletalk situation often remains imperceptible to the listener either due to the brevity of the clip, depending both upon clip duration and the particular sound being clipped, or because speech is dominated by one speaker or the other during doubletalk in normal conversation. It should be noted in the cases illustrated in FIGS. 2A and 2B, dependent on whether the initial threshold level is adaptive or set to a predetermined value, that the higher threshold may either be itself adaptive or be increased by a fixed amount so that during the presence of received speech the threshold level exceeds the additive level of the echo and the noise.

Figure 3:
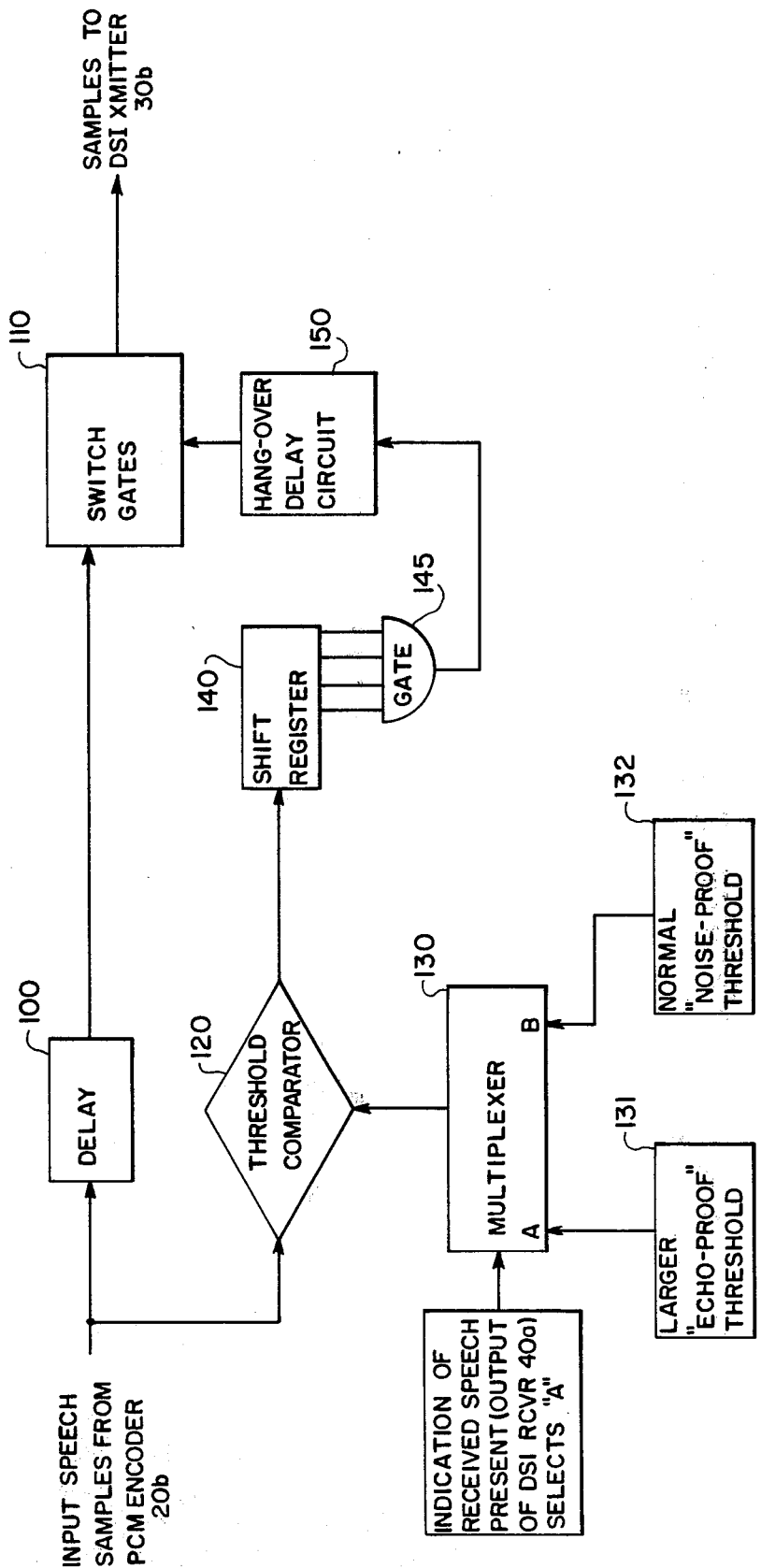
FIG. 3 illustrates in schematic form one embodiment of an echo control circuit according to the invention utilizing a threshold voice switch in conjunction with a DSI system as shown in FIG. 1.

FIG. 3 illustrates in a block diagram an example of how the principles of the invention may be implemented. This figure shows an embodiment which employs a voice switch having a fixed "noise-proof" threshold which operates in accordance with the invention as illustrated in FIG. 2A. This embodiment particularly is shown in a manner which may be used in conjunction with the DSI telephone communication system shown in FIG. 1. Throughout the following description therefore, reference will be made to the DSI system and its components which are shown in FIG. 1. It is to be further understood that the embodiment of the invention shown in FIG. 3 is to be considered as being employed by the terminal associated with telephone 10b of FIG. 1, and that a similar arrangement would be provided at the terminal associated with telephone 10a of that Figure to eliminate the echo heard by talker B. To avoid redundancy, therefore, implementation of the invention at only one terminal is described. It will also be understood that the embodiment described in FIG. 3 may be considered for use with DSI systems wherein speech signals are sampled and PCM (pulse code modulation) encoded on a periodic basis, and where adjacent telephone terminals utilize PCM encoder/decoder and transmitter/receiver apparatus on a time-shared basis and where the shared apparatus operates with a plurality of transmit and receive channels as discussed in the aforementioned article of Campanella and noted U.S. patents. (The PCM encoded signals represent a digital word obtained by analog to digital conversion, made typically at the Nyquist rate of once every 125 usec.)

Accordingly it should be understood that the operation of the voice-activated switch employed in the invention may be considered as also being utilized on a time-shared basis corresponding to the arrangement employed for the other time-shared apparatus in such DSI system where time shared apparatus is used. Since these arrangements differ among the various DSI systems known in the art, they will not be discussed in detail herein. In general it is necessary that the switch be activated by appropriate received PCM sample signals and transmitted PCM sample signals properly coordinated for the interpolated conversations in the DSI systems. Examples of the incorporation of voice switches in such multiplexed arrangements may be found in U.S. Pat. Nos. 3,649,766 (LaMarche) entitled "Digital Speech Detection System"; 3,794,763 (Boudewijns et al) entitled "Speech-Controlled Switching Arrangements" and 3,832,491 (Scuilli et al) entitled "Digital Voice Switch with an Adaptive Digitally-Controlled Threshold".

Shown in FIG. 3 is a speech detection circuit which uses a threshold-type voice switch in conjunction with a DSI transmitter such as 30b shown in FIG. 1, to sense the presence of a speech signal samples prior to transmission. Since some DSI systems employ a voice switch in the DSI transmitter of each channel in the system to control the operation of that transmitter for purposes of the description of the embodiment of FIG. 3, the voice switch apparatus may be considered that normally associated with a transmitter such as 30b for noise rejection, but being operated in accordance with the principles of the invention. Examples of the incorporation of such noise switches in DSI systems for noise rejection may also be had by reference to patents cited in the preceeding paragraph.

The embodiment shown in FIG. 3 employs a voice switch adapted to receive PCM encoded speech signal samples from PCM A-D encoder 20b of FIG. 1, and regulate the transmission of such signal samples to the DSI transmitter 30b by means of a set of gates 110. Gates 110 enable the transmission of the PCM signals to DSI transmitter 30b under control of a circuit responsive to the amplitude of the PCM signals from encoder 20b. PCM signals that exceed a threshold, selected according to the invention, will cause the gates 110 to be opened and will be transmitted. To this end, speech signal samples from encoder 20b are also applied to a conventional digital threshold comparator 120. This device digitally compares the encoded signals from encoder 20b to one of two selected threshold levels. One of the two levels is selected on the basis of the occurrence of received speech signal samples at the DSI receiver 40a associated with telephone 10b. To this end, multiplexer 130 is provided which selects one of the two levels and applies the selected level to comparator 120. It is adapted to respond to the presence of received speech signal samples at DSI receiver 40a, and, depending on whether or not these signals samples are present, would apply either a larger echo-proof or smaller noise-proof threshold level to the comparator 120. The larger echo-proof threshold is applied when receiver 40a indicates the presence of received speech signal samples and the lower noise-proof threshold is used in all other instances. If only received samples are present it is still necessary to utilize the higher echo-proof threshold even when no speech is to be transmitted from telephone 10b since it is advantageous in this situation to prevent unnecessary false encoding and transmission of echo signals by the system.

In the simplest case detection of the receive signal may be accomplished by a conventional current sensor whose output may control multiplexer 130, however the detection in a DSI system is more complex. Many DSI systems use a time-sharing arrangement for utilizing the tranmitter/receiver and encoder/decoder pairs at each side of the communications system (e.g., 30b, 40a and 20b, 50a, respectively at the talker B side in FIG. 1) for a multiplicity of transmit and receive channels so that transmit and receive signal samples may be properly routed and assigned among the several talkers in the system. Various arrangements of effecting such assignments in DSI are discussed in the aforementioned article of Campanella and the noted U.S. Patents. In all such arrangements it is necessary that the appropriate output of the receiver 40a for each conversation be coordinated for the gates 110 in the transmit path so that the gates 110 receive the appropriate signal samples and are activated for the appropriate conversation. Thus the input to multiplexer 130 from receiver 40a should itself be multiplexed to coordinate the appropriate received signal samples from the receiver 40b with the appropriate signal samples applied by encoder 20b to gates 110 for a given conversation. The way in which this is done, of course, is dependent upon the way in which the transmitter/receiver apparatus is time-shared among the multiple channels used in the DSI system. However, it would be similar to the way in which the received and transmitted signal samples are coordinated by the DSI system.

In DSI systems the indication by receiver 40a of present receive signal samples for multiplexer 130 can be obtained in a relatively straightforward way. In many DSI schemes, DSI receiver 40a produces in appropriate sequence for channel assignment, digital words corresponding to a PCM-coded receive signal sample for each channel, or an indicator of which channels are idle (no received sample). In this type of DSI system, an appropriate logic arrangement may be used to sense these digital words, such as a shift register with at least the number of positions as bits of the PCM code for the signal samples, and an OR gate with inputs corresponding to each position in the register. The shift register of this arrangement may receive the sequential PCM samples from the receiver 40a, and be reset before each new sample is applied to it. The OR gate in this way indicates the presence or absence of a receive speech sample in the sequence. The OR gate may thus supply the control signal indicative of received speech to multiplexer 130. Alternatively, in speech predictive encoded communications DSI systems (SPEC) as described in U.S. Pat. Nos. 3,988,674 and 3,927,268, the sample assignment work (SAW) itself furnishes the receive channel usage information directly.

The two threshold levels to be selected by multiplexer 130 are provided by level signal sources 131 and 132. As the presently described embodiment relates to DSI systems where the speech samples are in a PCM code, these sources would respectively apply appropriate digital words corresponding to the upper "echo-proof" signal threshold and the lower "noise-proof" signal threshold. The operation of threshold comparator 120 is thus dependent upon the presence or absence of received speech signal samples at the receiver 40a; it thus compares the transmit signal samples to either a higher or lower threshold supplied by the multiplexer 130 to determine whether the speech signal samples produced by encoder 20b are found to exceed the selected threshold.

The threshold comparator 120 produces a digital signal indicating whether or not the encoded speech samples from encoder 20b exceed whichever of the lower (132) or higher (131) threshold which has been selected by multiplexer 130. In order that these digital signals may control the conduction of gates 110, a shift register 140 is provided to receive the digital indications produced by comparator 120. The shift register 140 is adapted to count the number of successive times the signal samples applied to detector 120 exceeds the selected threshold within a given amount of time, such as, for example, a period of three or four times the sampling period of the DSI encoder 20b, corresponding to multiples of the Nyquist sampling period of 125 μsec. The choice of a number, such as three or four, of such successive samples above the threshold as a precondition to actuation of gate 110 can be established by empirical testing. It represents a compromise choice among competing criteria: noise "spike" rejection, threshold level, and speech "clipping". For a discussion of how such a choice may be made, see the article, "A New Digital Voice-Activated Switch" by J. A. Jankowski, Jr., *Comsat Technical Review*, Vol. 6, No. 1, Spring 1976, pp. 159–178 and U.S. Pat. Nos. 4,008,375 and 4,052,568 noted above.

AND gate 145 is provided to receive the output of the shift register 140. The input to AND gate 145 from shift register 140 is so configured that if the aforementioned predetermined number of successive samples (the configuration of four successive samples is illustrated) are found to exceed the selected threshold, an output signal is generated from AND gate 145 and applied to hangover circuit 150 which allows gates 110 to remain open for a suitable period for hangover delay. Typically, this delay is about 150 milliseconds and allows the gates 110 to remain open subsequent to the removal of the output signal from AND gate 145. Switch gates 110 are normally non-conductive to prevent transmission of the signal samples applied to it but with the presence of the control signals provided by the AND gate 145, gate 110 is rendered conductive. It thus allows the samples obtained from the encoder 20b to be applied to the DSI transmitter 30b. A delay circuit 100 is also provided between encoder 20b and gates 110 to delay the encoder output from reaching the gates prior to the completion of operation of comparator 120, register 140 and gate 145 which determine the state of gates 110. This delay period typically would be on the order of 4–5 milliseconds.

Thus, when echo conditions are present (the detection of receive speech signal samples) switch gates 110 inhibit the transmission of any signal samples supplied by the encoder 20b that fail to exceed the higher "echo-proof" threshold supplied by source 131. It will be understood that if the normal threshold 132 is an adaptive one which is continually adjusted to be above the noise level, the larger threshold 131 may be either itself adaptive or have a level which is a fixed increment above level 132, as long as the difference between thresholds 131 and 132 is always sufficiently large to block the echo signals, as shown in FIGS. 2A and 2B.

Figure 3A:
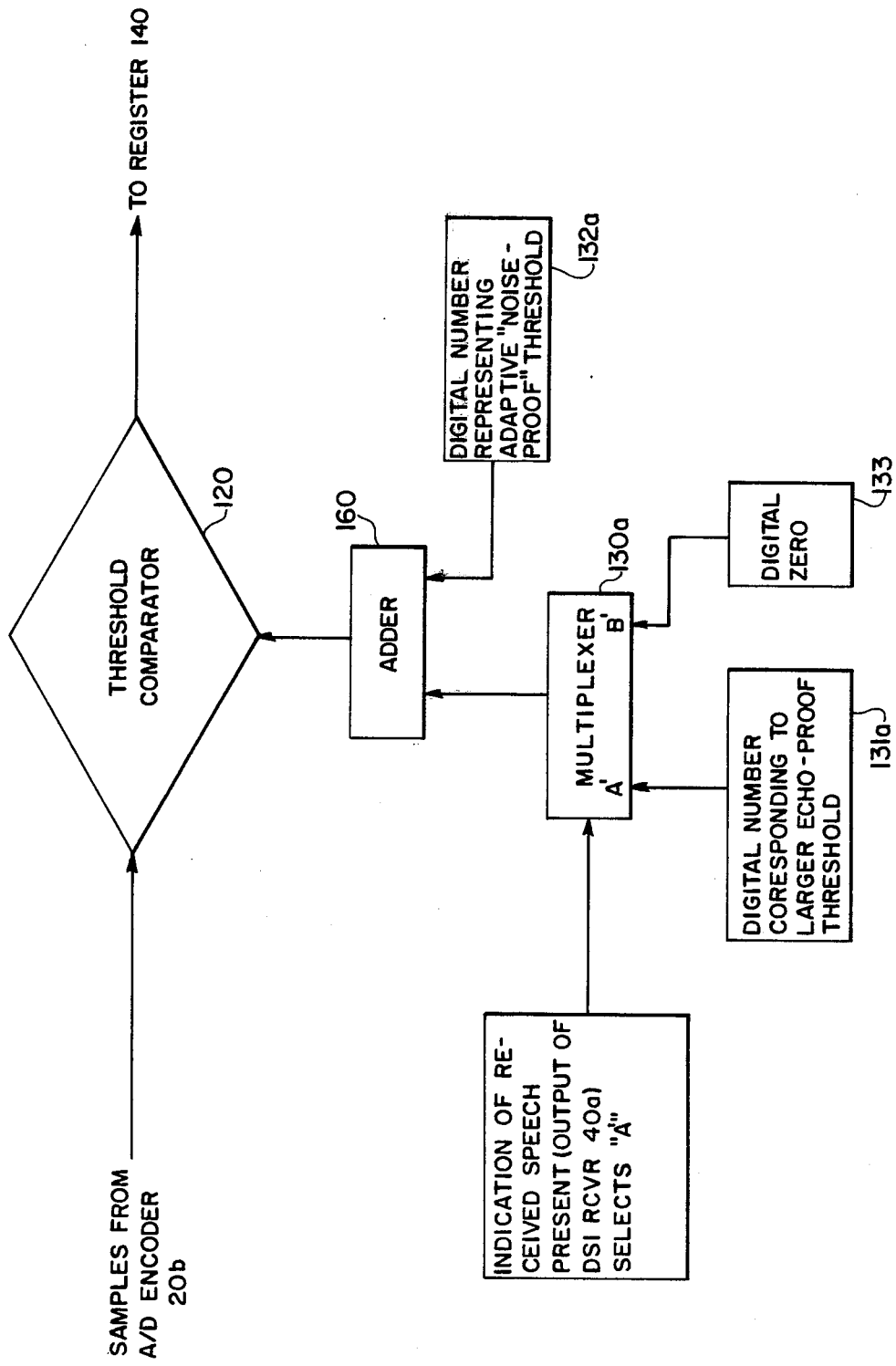
FIG. 3A shows a variation of an embodiment of the invention shown in FIG. 3 with an adaptive voice switch threshold.

FIG. 3A shows one way in which principles of the invention illustrated in FIG. 2B may be used in conjunction with a voice switch having an adaptively-varied "noise-proof" threshold. In this figure, items and components which are the same or similar to those of FIG. 3 bear the same number designations as in the former Figure. It will be understood that in those other respects which are not shown, the embodiment described with reference to FIG. 3A will be similar to that shown in FIG. 3.

As in FIG. 3, the embodiment shown in FIG. 3A operates with digitally-encoded speech samples. Accordingly, an adder 160 is provided to add a digital representation of the adaptive "noise-proof" threshold provided by source 132a to the output of multiplexer 130a. Multiplexer 130a may be similar to multiplexer 130, but in this embodiment, it provides a digital number corresponding either to zero volts, provided by source 133, or to the amount of difference between the normal "noise-proof" threshold and the higher "echo-proof" threshold to an adder 160. A digital number indicative of this difference may be provided by source 131a. As has been described with respect to multiplexer 130 in FIG. 3, multiplexer 130a operates in a manner responsive to the presence or absence of an output from DSI decoder 40a to select the appropriate one of these digital numbers to be applied to adder 160. Adder 160 thus adds the multiplexer output to the adaptive digital threshold, and corresponding to the condition of DSI receiver 40a, applies either a first threshold (adaptive "noise-proof" threshold+0) to comparator 120, or a second threshold (adaptive "noise-proof" threshold+ "echo-proof" threshold increase) to comparator 120. For an example of how the lower adaptive "noise-proof" threshold may be obtained see the aforementioned article to Jankowski, or copending U.S. Pat. No. 4,052,568, as noted above.

The foregoing embodiments have been described in relation to a DSI system. As has been mentioned, it is believed that this particular application is a favorable one for the invention. One reason is that such systems normally employ a voice-activated switch to activate the DSI transmitters, no additional received speech detector is necessary as a normal PCM speech decoder, such as 40a, readily provides such information so that the implementation of the invention would require little additional hardware. In other systems, appropriate equivalent sensing means may be required. Of course, it should be understood that the present invention should not be viewed as being limited to DSI systems, or any system in particular. For example, in any telephone system which employs a two-to-four wire hybrid interface, a voice-sensitive switch may be provided in the transmit channel for each terminal to be operated in the manner described by appropriately elevating the threshold when received signals are present at the terminal to block any echo created at the hybrid interface.

Figure 4:
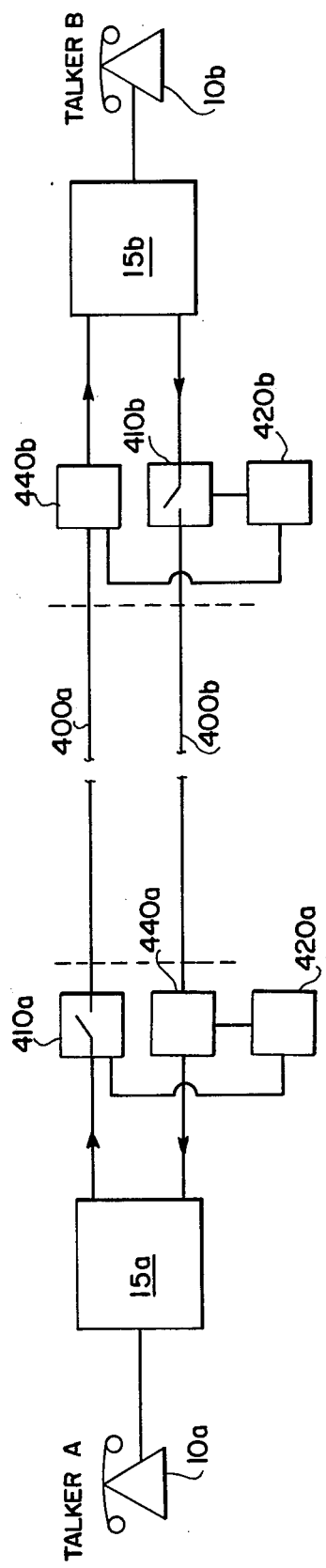
FIG. 4 is a general illustration of the employment of the invention in any telephone circuit using a two-to-four wire hybrid interface.

FIG. 4 shows such a general case. In this Figure, two talkers, A and B, using telephones 10a and 10b respectively, are connected in a telephone circuit having two two-to-four wire hybrid couplers 15a and 15b, which are interconnected by trunk lines 400a and 400b. Line 400a represents a transmit channel for talker A and a receive channel for talker B. Line 400b represents a transmit channel for talker B and a receive channel for talker A. Echo control can be obtained in this circuit by employing a voice-activated switch in the transmit channels for talkers A and B, such as shown by switches 410a and 410b. These switches are threshold sensitive voice-activated switches of the type previously described and are controlled in the manner of the invention. They have the same function as the gates 110 described in FIG. 3, that is, they block the transmission of signals on the channel which fail to exceed the threshold. To provide suitable control in the manner of the invention, threshold level adjustment for the voice-activated switches is obtained by receive signal sensors 440a and 440b in the receive channel for each telephone and associated level selector circuits 420a and 420b. The sensors 440a, 440b indicate the presence of received signals at a telephone; level selector circuits 420a and 420b apply an "echo-proof" threshold to their respective switches 410a and 410b, if its respective sensors 440a or 440b indicates the presence of received signals, and apply a lower threshold otherwise. If it is desired only to block echo where noise is not a problem, the lower threshold can be a zero level that allows all signal levels on the channel to be transmitted, otherwise a suitable noise-proof threshold may be used if it is desired to block noise. If an analog communications system is being used, these thresholds may be supplied by appropriate DC voltages, and sensors 440a and 440b may be simple current sensors such as inductive pickups indicating the presence of signals on the receive channels or trunk lines. Obviously switches 410a and 410b, level selectors 420a and 420b, and sensors 440a and 440b operate in a manner that is exactly analogous to the operation of the equivalent devices shown in the DSI-related embodiments of FIGS. 3 and 3A.

Accordingly, the invention can be seen as useful in any situation where it is desirable to use a voice switch to limit noise and eliminate echo in communications circuits and in all those employing a two-to-four wire interface. It should prove attractive in analog interpolation methods, where voice switches are used to enable interpolation in signal-free time periods in the communications methods as well as in digital interpolation methods. It is considerably less expensive and complicated than echo cancellers, and in operation, is less offensive than suppressors.

What is claimed is:

1. Apparatus for blocking echo signals in a telephone communications circuit comprised of individual channels for transmission and reception of voice signals between telephone terminals, said apparatus comprising:
   (a) means for sensing the presence of received voice signals in the receive channel of a circuit at one terminal;
   (b) comparison means for comparing signals to be transmitted from said terminal to a selectable threshold level and indicating if said transmitted signal exceeds the selectable threshold level;
   (c) means responsive to said sensing means for selecting either a first threshold level or a second threshold level, said first threshold level being greater in magnitude than the level of noise in said transmission channel and said second threshold level being higher in amplitude than said first level and greater than that of said echo signals said second level being selected upon the detection by said sensing means of the presence of received voice signals in said receive channel at said terminal; and
   (d) inhibiting means responsive to said comparison means for inhibiting transmission of said voice signals to be transmitted in the transmit channel of said circuit at said terminal unless said comparison means indicates that said voice signals to be transmitted exceed said selected threshold level.

2. The apparatus of claim 1 further including hold-over circuit means operatively associated with said inhibiting means for delaying the inhibition of said transmitted signals by a predetermined time interval after voice signals fall below either said first or second selected level.

3. The apparatus of claim 1 wherein said comparison means includes means for delaying the operation of said inhibiting means until said voice signal exceeds said selectable threshold for a predetermined amount of time.

4. The apparatus of claim 1 wherein said first threshold level is adaptively adjusted to exceed the level of noise in said transmit channel by a predetermined amount, and, which includes means for selecting a second level that exceeds said first level by a predetermined amount so that said second level is greater than the level of echo signals.

5. The apparatus of claim 1 wherein said communications system includes means for digitally encoding said voice signals for transmission and means for decoding said encoded voice signals for reception, wherein said voice signals are sampled on a periodic basis so that a digital representation of voice signal samples may be derived in each period and wherein said comparison means includes:
   a threshold comparator adapted to receive said encoded signals received at said terminal and for indicating whether each sample exceeds said selectable threshold, and
   control means responsive to said threshold comparator for generating a control signal applied to said inhibiting means in response to a predetermined number of samples exceeding said selectable threshold within a predetermined number of periods to render said means for inhibiting transmission of said voice signals conductive to allow transmission of said voice signals.

6. The apparatus of claim 5 wherein said control means for generating a control signal comprises:
   means for registering the number of times within said predetermined number of periods said transmitted voice signal exceeds said selectable threshold in response to the indication of said threshold comparator; and means adapted to render said inhibiting means conductive in response to the registration in said registering means of a predetermined number of samples exceeding said selectable threshold within the predetermined number of periods.

7. The apparatus of claim 6 further including a delay means adapted to receive said transmitted voice signals for delaying the application thereof of said inhibiting means.

8. The apparatus of claim 6 further including a hangover circuit means for continuing the conduction of said inhibiting means for a predetermined period after said control signal has been removed.

9. The apparatus according to claim 6 wherein said means for selecting either a first threshold level or a second threshold level includes:
 a first source of signals corresponding to said first level, said first level signals being adaptively adjusted to exceed the noise signals present in said transmit channel for said terminal,
 a second source of signals corresponding to said second level, said second level signals being of a magnitude such that the sum of said first and second level signal exceeds the level of echo in said transmit channel,
 a third source of signals corresponding to a zero level,
 means responsive to said sensing means for selecting said second or third source, said second source being selected upon the detection by said sensing means of the presence of received speech signals, said third source being selected otherwise, and
 adder means for adding signals from the source selected by said means responsive to said sensing means to the signals of said first source and applying the sum to said threshold comparator.

10. The apparatus of claim 5 including means for adjusting said first level to exceed the level of noise in said transmit channel by a predetermined amount and for selecting a second level that exceeds the first level by a predetermined amount.

11. The apparatus of claim 5 wherein said means for selecting either a first threshold level or a second threshold level includes:
 a first source of signals corresponding to said first level,
 a second source of signals corresponding to said second level, and
 means responsive to said sensing means for applying said signals from said second source to said threshold comparator when received voice signals are indicated by said sensing means and applying said signals from said first source to said threshold comparator otherwise.

12. The apparatus of claim 1 wherein said means for selecting either a first threshold level or a second threshold level includes:
 a first source of signals corresponding to said first level;
 a second source of signals corresponding to said second level; and
 means responsive to said sensing means for applying said signals from said second source to said comparison means when received voice signals are indicated by said sensing means, and applying said signals from said first source to said comparison means otherwise.

* * * * *